(12) United States Patent
Aida

(10) Patent No.: US 11,742,143 B2
(45) Date of Patent: Aug. 29, 2023

(54) MULTI-LAYER CERAMIC CAPACITOR AND METHOD OF PRODUCING THE SAME

(71) Applicant: TAIYO YUDEN CO., LTD., Tokyo (JP)

(72) Inventor: Shin Aida, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 9 days.

(21) Appl. No.: 16/743,989

(22) Filed: Jan. 15, 2020

(65) Prior Publication Data

US 2020/0234879 A1 Jul. 23, 2020

(30) Foreign Application Priority Data

Jan. 22, 2019 (JP) .............................. JP2019-008774

(51) Int. Cl.
    *H01G 4/005* (2006.01)
    *H01G 4/30* (2006.01)
    *H01G 4/10* (2006.01)

(52) U.S. Cl.
    CPC ............... *H01G 4/005* (2013.01); *H01G 4/10* (2013.01); *H01G 4/30* (2013.01)

(58) Field of Classification Search
    CPC ............ H01G 4/10; H01G 4/30; H01G 4/005; H01G 4/12; H10G 4/10
    USPC ....... 361/321.1, 303, 301.4, 321.5, 311, 312, 361/321.4
    See application file for complete search history.

(56) References Cited

U.S. PATENT DOCUMENTS

| | | | |
|---|---|---|---|
| 2003/0062112 A1* | 4/2003 | Matsumoto | B32B 18/00 156/89.16 |
| 2012/0073129 A1 | 3/2012 | Abe et al. | |
| 2012/0250220 A1* | 10/2012 | Yamashita | H01G 4/005 361/321.2 |
| 2014/0125194 A1* | 5/2014 | Lee | H01L 41/0472 336/200 |
| 2014/0301014 A1* | 10/2014 | Kim | H01G 4/30 156/89.12 |
| 2015/0318109 A1* | 11/2015 | Lee | H01G 4/385 361/301.4 |

(Continued)

FOREIGN PATENT DOCUMENTS

JP 2012094819 A 5/2012

*Primary Examiner* — Arun Ramaswamy
(74) *Attorney, Agent, or Firm* — Law Office of Katsuhiro Arai

(57) ABSTRACT

A multi-layer ceramic capacitor includes a ceramic multi-layer chip, a side margin, and a bonding portion. The ceramic multi-layer chip includes a capacitance forming unit including internal electrodes, the internal electrodes being laminated in a first direction and including a base metal material as a main component, positions of end portions of the internal electrodes in a second direction orthogonal to the first direction being aligned with one another within a range of 0.5 μm in the second direction, and a cover that is disposed outside the capacitance forming unit in the first direction and includes ceramics as a main component. The side margin includes ceramics as a main component and covers the ceramic multi-layer chip in the second direction. The bonding portion is disposed on a bonding surface and includes an oxide including the base metal material, the bonding surface being bonded to the side margin on the cover.

12 Claims, 8 Drawing Sheets

(56) References Cited

U.S. PATENT DOCUMENTS

2016/0126014 A1* 5/2016 Lee .................. H01G 4/224
 29/25.42
2018/0061575 A1* 3/2018 Mizuno ............... H01G 4/224
2020/0075254 A1* 3/2020 Park .................. H01G 4/0085

* cited by examiner

MULTI-LAYER CERAMIC CAPACITOR AND METHOD OF PRODUCING THE SAME

BACKGROUND ART

The present disclosure relates to a multi-layer ceramic capacitor including side margins and to a method of producing the multi-layer ceramic capacitor.

The technique of providing side margins to protect the periphery of internal electrodes is known in methods of producing a multi-layer ceramic capacitor. For example, a multi-layer ceramic capacitor disclosed in Japanese Patent Application Laid-open No. 2012-94819 includes: a laminate portion including internal electrodes, which are exposed on the side surfaces of the laminate portion; and ceramic side surface layers, which are provided as side margins to the side surfaces of the laminate portion.

SUMMARY OF THE INVENTION

As disclosed in Japanese Patent Application Laid-open No. 2012-94819, when the side margins (ceramic side surface layers) are provided to the side surfaces of the laminate portion, the laminate portion and the side margins have stress generated in directions moving away from each other, because the sintering behaviors of the internal electrodes, which are formed of a metal material, and the side margins are different from each other during sintering. For that reason, cracks and peeling easily occur in a bonding surface of the side margin, which easily leads to a reduction in environmental resistance such as moisture resistance.

In view of the circumstances as described above, it is desirable to provide a multi-layer ceramic capacitor having high environmental resistance and a method of producing such a multi-layer ceramic capacitor.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multi-layer ceramic capacitor including a ceramic multi-layer chip, a side margin, and a bonding portion.

The ceramic multi-layer chip includes a capacitance forming unit and a cover.

The capacitance forming unit includes internal electrodes, the internal electrodes being laminated in a first direction and including a base metal material as a main component, positions of end portions of the internal electrodes in a second direction orthogonal to the first direction being aligned with one another within a range of 0.5 μm in the second direction. The cover is disposed outside the capacitance forming unit in the first direction and includes ceramics as a main component.

The side margin includes ceramics as a main component and covers the ceramic multi-layer chip in the second direction.

The bonding portion is disposed on a bonding surface and includes an oxide including the base metal material, the bonding surface being bonded to the side margin on the cover.

During the sintering of the multi-layer ceramic capacitor, the internal electrodes formed of the base metal material start to be sintered at a temperature of several hundreds of degrees Celsius. Along with the sintering, the internal electrodes shrink toward the center of the ceramic multi-layer chip. Meanwhile, the side margin is unsintered at a temperature of several hundreds of degrees Celsius and do not shrink. For that reason, stress in directions moving away from each other is generated between the ceramic multi-layer chip including the internal electrodes and the side margin.

Meanwhile, the bonding portion starts to be generated, as the oxide including the base metal material, at a temperature of several hundreds of degrees Celsius at which the internal electrodes start to be sintered. The bonding portion has higher strength than the strength of the unsintered ceramics. Providing the bonding portion to the bonding surface between the ceramic multi-layer chip and the side margin allows a configuration with high strength to be provided to the bonding surface in which stress is generated. Such a configuration can provide resistance to the stress.

Further, the bonding strength between the oxidized base metal material and the ceramics is higher than the bonding strength between the unsintered ceramics, i.e., the ceramic portion of the ceramic multi-layer chip and the side margin. So, the bonding portion can enhance the bonding strength between the ceramic multi-layer chip and the side margin and can prevent cracks and peeling from being formed in the bonding surface even if the stress occurs.

Therefore, it is possible to suppress the entering of moisture or the like from cracks and peeling into the multi-layer ceramic capacitor and to enhance the environmental resistance of the multi-layer ceramic capacitor.

The bonding portion may include a plurality of particles disposed away from one another.

This allows the particles to be dispersedly disposed in the bonding surface and allows the bonding strength in the bonding surface to be uniformly distributed. This can enhance the bonding strength of the entire bonding surface and prevent voids and the like, which become causes of cracks and peeling, from being locally formed.

An area occupancy ratio of the bonding portion to the bonding surface may be 0.3% or more.

This allows the bonding portion to sufficiently exert the effect of preventing the occurrence of cracks and peeling.

An area occupancy ratio of the bonding portion to the bonding surface may be 10% or less.

This allows the bonding surface to ensure insulation properties.

For example, the base metal material may include nickel.

The oxide may include magnesium. The ceramic multi-layer chip may include a side surface facing in the second direction, and the bonding surface may include a region occupied by the cover on the side surface.

In another aspect, the present disclosure provides a method of producing a multi-layer ceramic capacitor, the method including: producing an unsintered ceramic multi-layer chip, the unsintered ceramic multi-layer chip including an unsintered capacitance forming unit including internal electrodes, the internal electrodes being laminated in a first direction and including a base metal material as a main component, an unsintered cover that is disposed outside the unsintered capacitance forming unit in the first direction and includes ceramics as a main component, and a side surface facing in a second direction orthogonal to the first direction, the internal electrodes being exposed from the side surface; causing base metal particles to adhere to a region occupied by the cover on the side surface; producing a ceramic body by providing a side margin to the side surface of the unsintered ceramic multi-layer chip; and sintering the ceramic body and oxidizing the base metal particles, to form a bonding portion on a bonding surface bonded to the side margin on the cover, the bonding portion including an oxide including the base metal material.

As described above, according to the present disclosure, it is possible to provide a multi-layer ceramic capacitor having high environmental resistance and a method of producing the multi-layer ceramic capacitor.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the invention as claimed.

DETAILED DESCRIPTION OF THE EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. Basic Configuration of Multi-Layer Ceramic Capacitor 10

Figure 1:
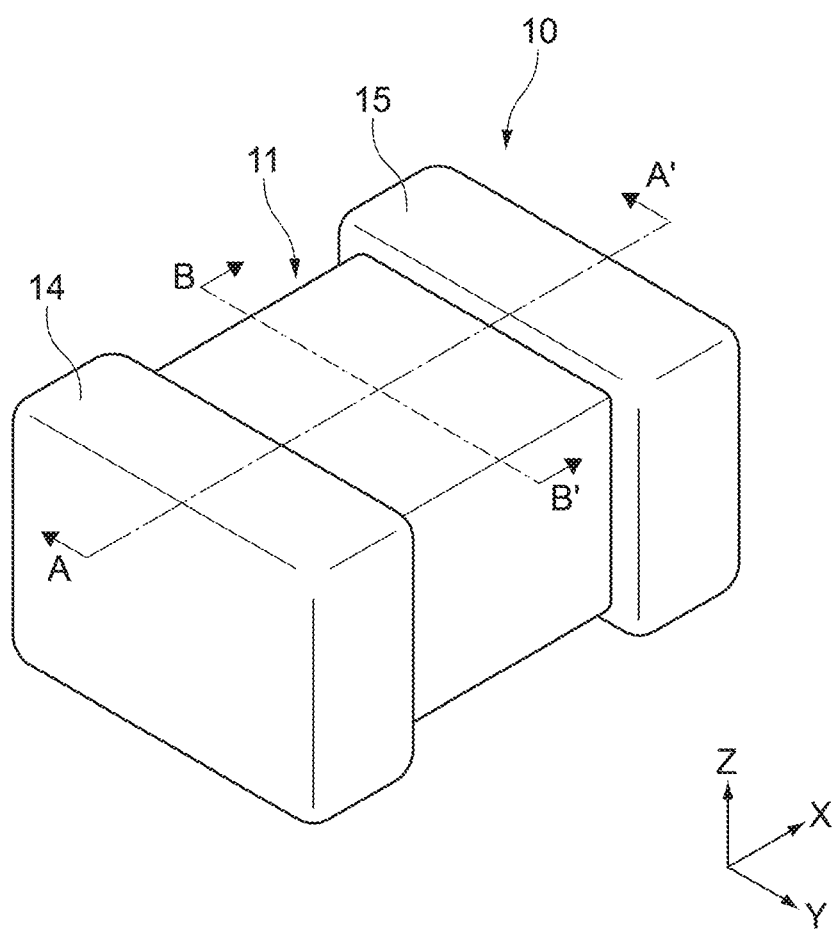
FIG. 1 is a perspective view of a multi-layer ceramic capacitor according to an embodiment of the present disclosure.
Figure 2:
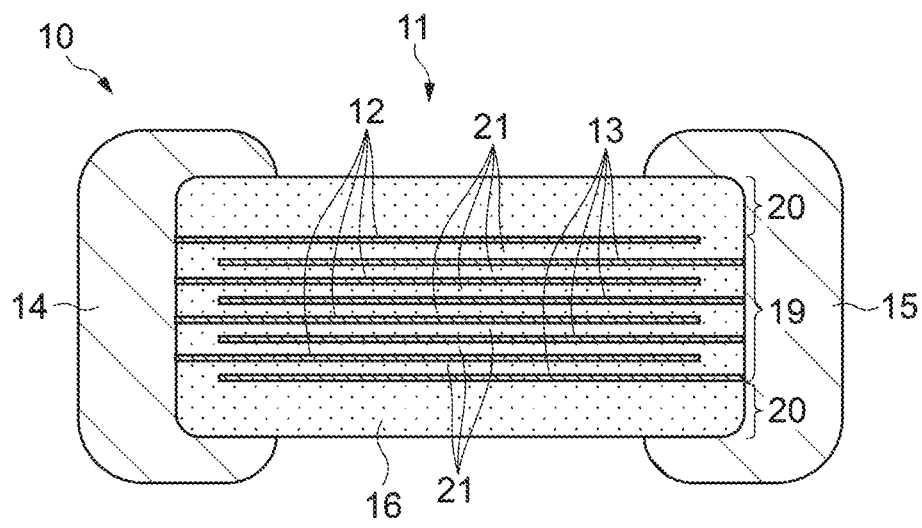
FIG. 2 is a cross-sectional view of the multi-layer ceramic capacitor taken along the A-A' line in FIG. 1.
Figure 3:
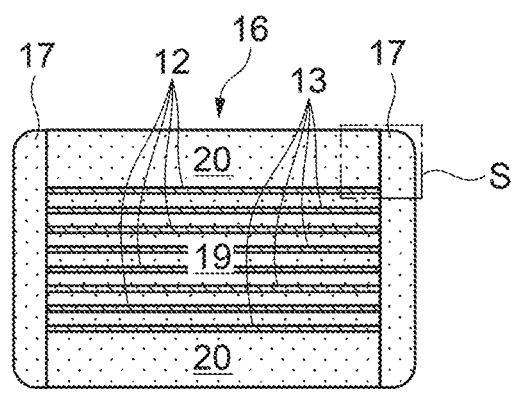
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. The ceramic body 11 typically has two end surfaces facing in the X-axis direction, two side surfaces facing in the Y-axis direction, and two main surfaces facing in the Z-axis direction. Ridges connecting the respective surfaces of the ceramic body 11 are chamfered.

It should be noted that the shape of the ceramic body 11 is not limited to the above shape. In other words, the ceramic body 11 does not need to have the rectangular parallelepiped shape as shown in FIGS. 1 to 3. For example, the surfaces of the ceramic body 11 may be curved surfaces, and the ceramic body 11 may be rounded as a whole.

The first and second external electrodes 14 and 15 cover both the end surfaces of the ceramic body 11, which face in the X-axis direction. The first and second external electrodes 14 and 15 extend to the four surfaces (two main surfaces and two side surfaces) connected to both the end surfaces facing in the X-axis direction. With this configuration, both of the first and second external electrodes 14 and 15 have U-shaped cross sections parallel to the X-Z plane and to the X-Y plane.

The ceramic body 11 includes a ceramic multi-layer chip (multi-layer chip) 16 and side margins 17. The side margins 17 cover the entire regions of the respective side surfaces of the multi-layer chip 16, which face in the Y-axis direction.

The multi-layer chip 16 includes a capacitance forming unit 19 and covers 20. The covers 20 respectively cover the upper and lower surfaces of the capacitance forming unit 19, which face in the Z-axis direction. The capacitance forming unit 19 includes a plurality of ceramic layers 21, a plurality of first internal electrodes 12, and a plurality of second internal electrodes 13. The covers 20 include no first and second internal electrodes 12 and 13.

The first and second internal electrodes 12 and 13 are alternately disposed along the Z-axis direction between the ceramic layers 21 laminated in the Z-axis direction. The first internal electrodes 12 are connected to the first external electrode 14 and are spaced apart from the second external electrode 15. The second internal electrodes 13 are connected to the second external electrode 15 and are spaced apart from the first external electrode 14.

The first and second internal electrodes 12 and 13 each include a base metal as a main component and function as internal electrodes of the multi-layer ceramic capacitor 10. Examples of the base metal constituting the first and second internal electrodes 12 and 13 typically include nickel (Ni), and copper (Cu) may also be used other than (Ni).

In such a manner, in the ceramic body 11, the side margins 17 and the covers 20 cover the surfaces of the capacitance forming unit 19 other than the end surfaces, which face in the X-axis direction and to which the first and second external electrodes 14 and 15 are provided. The side margins 17 and the covers 20 have main functions of protecting the periphery of the capacitance forming unit 19 and ensuring the insulation properties of the first and second internal electrodes 12 and 13.

The ceramic layers 21 disposed between the first and second internal electrodes 12 and 13 in the capacitance forming unit 19 are formed of dielectric ceramics. In the multi-layer ceramic capacitor 10, in order to increase the capacitance of the capacitance forming unit 19, dielectric ceramics having a high dielectric constant is used as dielectric ceramics constituting the ceramic layers 21.

More specifically, in the multi-layer ceramic capacitor 10, a polycrystal of a barium titanate ($BaTiO_3$) based material, i.e., a polycrystal having a Perovskite structure containing barium (Ba) and titanium (Ti) is used as the dielectric ceramics having a high dielectric constant constituting the ceramic layers 21. This provides a large capacitance to the multi-layer ceramic capacitor 10.

It should be noted that the ceramic layers 21 may include a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, and a titanium oxide ($TiO_2$) based material.

The side margins 17 and the covers 20 are also formed of dielectric ceramics. The material of the side margins 17 and the covers 20 only needs to be insulating ceramics, but if dielectric ceramics similar to that of the ceramic layers 21 is used therefor, internal stress in the ceramic body 11 is suppressed.

With the configuration described above, when a voltage is applied between the first external electrode 14 and the second external electrode 15 in the multi-layer ceramic capacitor 10, the voltage is applied to the plurality of ceramic layers 21 provided between the first internal electrodes 12 and the second internal electrodes 13. With this configuration, the multi-layer ceramic capacitor 10 stores charge corresponding to the voltage applied between the first external electrode 14 and the second external electrode 15.

It should be noted that the basic configuration of the multi-layer ceramic capacitor 10 according to this embodiment is not limited to the configuration shown in FIGS. 1 to 3 and can be changed as appropriate. For example, the number of first and second internal electrodes 12 and 13 and the thickness of the ceramic layer 21 can be determined as appropriate according to the size and performance expected for the multi-layer ceramic capacitor 10.

2. Detailed Configuration of Multi-Layer Ceramic Capacitor 10

The ceramic body 11 of the multi-layer ceramic capacitor 10 is produced by, for example, bonding unsintered side margins 17 to the side surfaces of an unsintered multi-layer chip 16, which face in the Y-axis direction, and sintering them. In the sintering step, due to different sintering temperatures of the metal material, which constitutes the first and second internal electrodes 12 and 13, and the dielectric ceramics, stress concentrates on the side surface, which is a boundary portion between the multi-layer chip 16 and the side margin 17. This raises a concern about the occurrence of cracks, peeling, and the like. In a case where cracks and peeling occur, moisture or the like is liable to enter the capacitance forming unit 19, and the environmental resistance of the multi-layer ceramic capacitor 10 decreases. Therefore, it is very important to ensure the bonding strength between the multi-layer chip 16 and the side margin 17.

The multi-layer ceramic capacitor 10 is characterized by including a bonding portion 22 so as to ensure the bonding strength between the multi-layer chip 16 and the side margin 17. Hereinafter, the configuration of the bonding portion 22 will be described using FIGS. 4 and 5.

Figure 4:
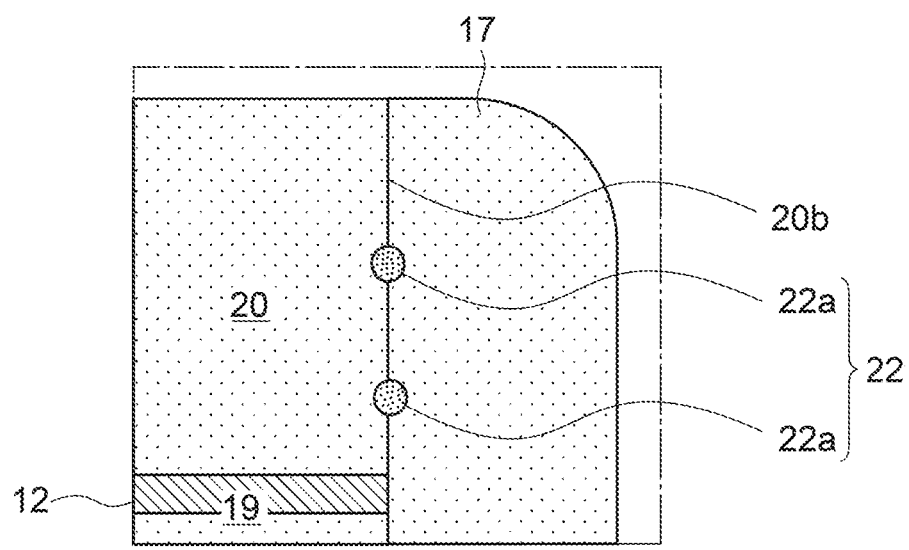
FIG. 4 is an enlarged cross-sectional view of a region S of the multi-layer ceramic capacitor shown in FIG. 3.
Figure 4:
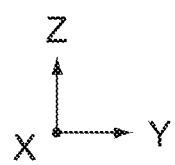
Figure 5:
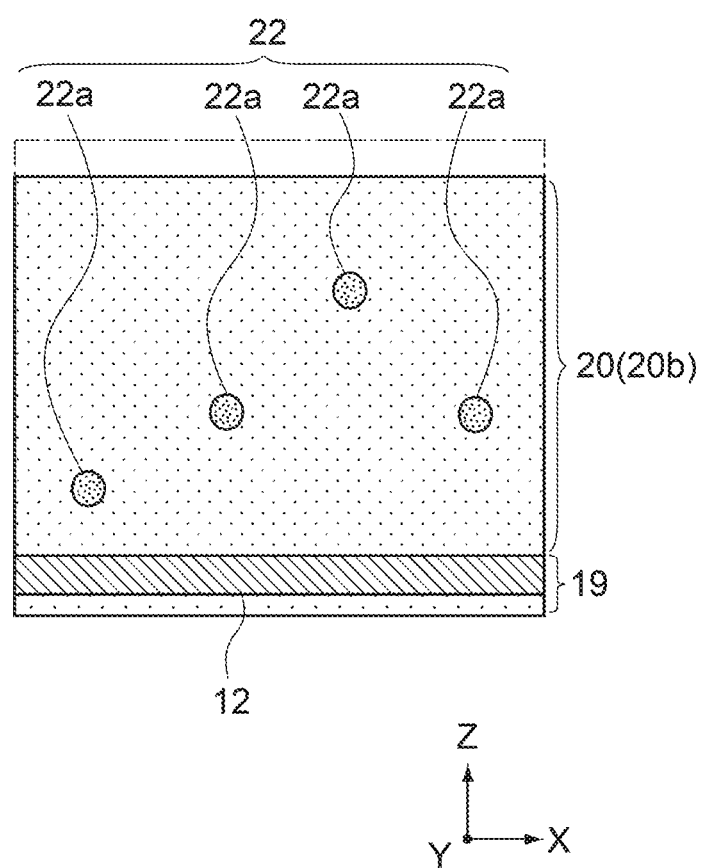
FIG. 5 is an enlarged partial cross-sectional view of a bonding surface bonded to a side margin on a cover of the multi-layer ceramic capacitor.

FIG. 4 is an enlarged view of a region S of the multi-layer ceramic capacitor 10 shown in FIG. 3 and is also a view showing the vicinity of a bonding surface 20b, which is bonded to the side margin 17 on the cover 20. FIG. 5 is a cross-sectional view schematically showing a partially enlarged bonding surface 20b.

As shown in FIGS. 4 and 5, the bonding portion 22 is disposed on the bonding surface 20b, which is bonded to the side margin 17 on the cover 20. The bonding surface 20b is a region occupied by the cover 20 on the side surface of the multi-layer chip 16, the side surface facing in the Y-axis direction.

The bonding portion 22 is formed of an oxide of a base metal such as nickel, which is the main component of the first and second internal electrodes 12 and 13. The bonding portion 22 has insulation properties. This can suppress the occurrence of short circuit due to the bonding portion 22. Further, the bonding portion 22 may include magnesium (Mg) in addition to nickel and may be formed of a nickel composite oxide including magnesium.

Providing the bonding portion 22, which is formed of the oxide of the base metal, to the bonding surface 20b allows a configuration with high strength to be provided to the bonding surface 20b in which stress is easy to occur during sintering. Such a configuration can increase the resistance to stress. Further, since the bonding portion 22 has high bonding property with respect to the side margin 17, the bonding strength between the bonding surface 20b and the side margin 17 can be increased.

In this embodiment, the bonding portion 22 includes a plurality of particles 22a disposed to be spaced apart from each other. The particles 22a of this embodiment are disposed, for example, dispersedly in a random manner in the bonding surface 20b. The bonding portion 22 includes the plurality of particles 22a and can thus disperse the particles 22a over the entire bonding surface 20b. This configuration can enhance the bonding strength of the bonding surface 20b across the board and effectively prevent cracks and peeling from occurring. Therefore, it is possible to suppress the entering of moisture or the like due to cracks and peeling and to enhance the environmental resistance of the multi-layer ceramic capacitor 10.

The shape of each particle 22a may be spherical, non-spherical, rod-like, rectangular, or the like. Further, each particle 22a may be configured as agglomeration of several fine particles. The particle size of each particle 22a is not particularly limited and is about 0.1 to 2.0 μm, for example. The particle size of each particle 22a herein is assumed as a dimension of a largest portion of the particle 22a, which is observed on the bonding surface 20b.

The area occupancy ratio of the bonding portion 22 to the bonding surface 20b may be 0.3% or more. This can sufficiently enhance the bonding strength between the bonding surface 20b and the side margins 17.

The area occupancy ratio of the bonding portion 22 to the bonding surface 20b may be 10% or less. This can provide more reliable insulation properties to the bonding surface 20b.

The area occupancy ratio of the bonding portion 22 to the bonding surface 20b may be calculated as follows.

First, the multi-layer ceramic capacitor 10 to be measured is mechanically polished to expose the bonding surface 20b and a cross section (for example, cross section shown in FIG. 2), which is perpendicular to the Y-axis direction, includes no bonding surface 20b, and is located at a position substantially divided into two in the Y-axis direction. The cross section of the cover 20 is referred to as a reference surface. Using a scanning electron microscope (SEM) or the like, a rectangular field having a size of 20 μm in the Z-axis direction and 100 μm in the X-axis direction is observed on each of the bonding surface 20b and the reference surface.

Using an energy dispersive X-ray spectrometry (EDS), the area of a region in which the oxide of the base metal is detected in the above-mentioned filed is calculated for each surface.

The area calculated for the reference surface is subtracted from the area calculated for the bonding surface 20b, and the obtained result is calculated as the area of the oxide of the base metal in the field of the bonding surface 20b. Subsequently, the ratio of the calculated area of the oxide of the base metal to the area of the field (2,000 µm$^2$) is calculated as the area occupancy ratio of the bonding portion 22 to the bonding surface 20b in the multi-layer ceramic capacitor 10.

In such a manner, in this embodiment, the bonding portion 22 is formed on the bonding surface 20b located outside the capacitance forming unit 19, which can prevent the occurrence of cracks and peeling between the bonding surface 20b and the side margin 17 and can effectively suppress the entering of moisture or the like into the capacitance forming unit 19. This makes it possible to enhance the environmental resistance of the multi-layer ceramic capacitor 10.

3. Method of Producing Multi-Layer Ceramic Capacitor 10

Figure 6:
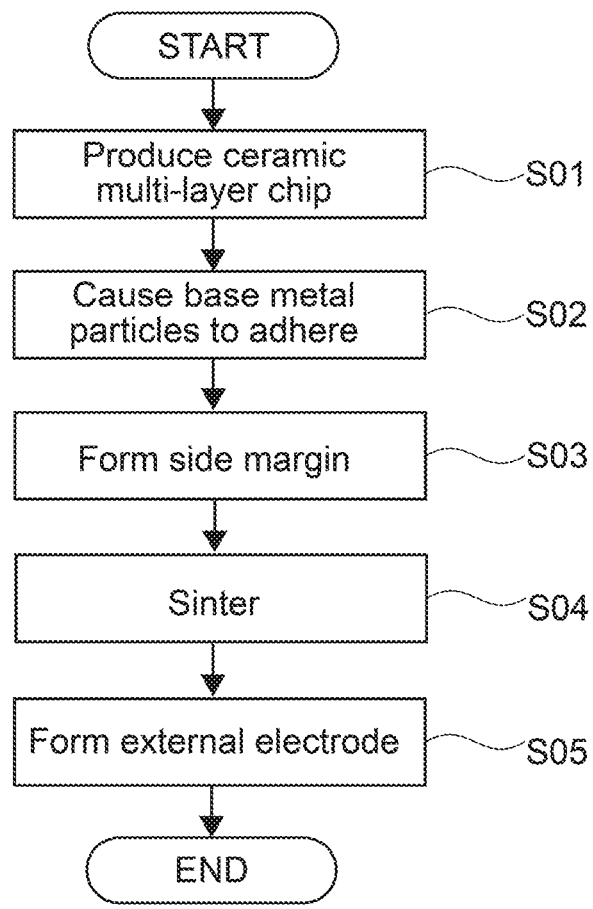
FIG. 6 is a flowchart showing a method of producing the multi-layer ceramic capacitor.
Figure 7:
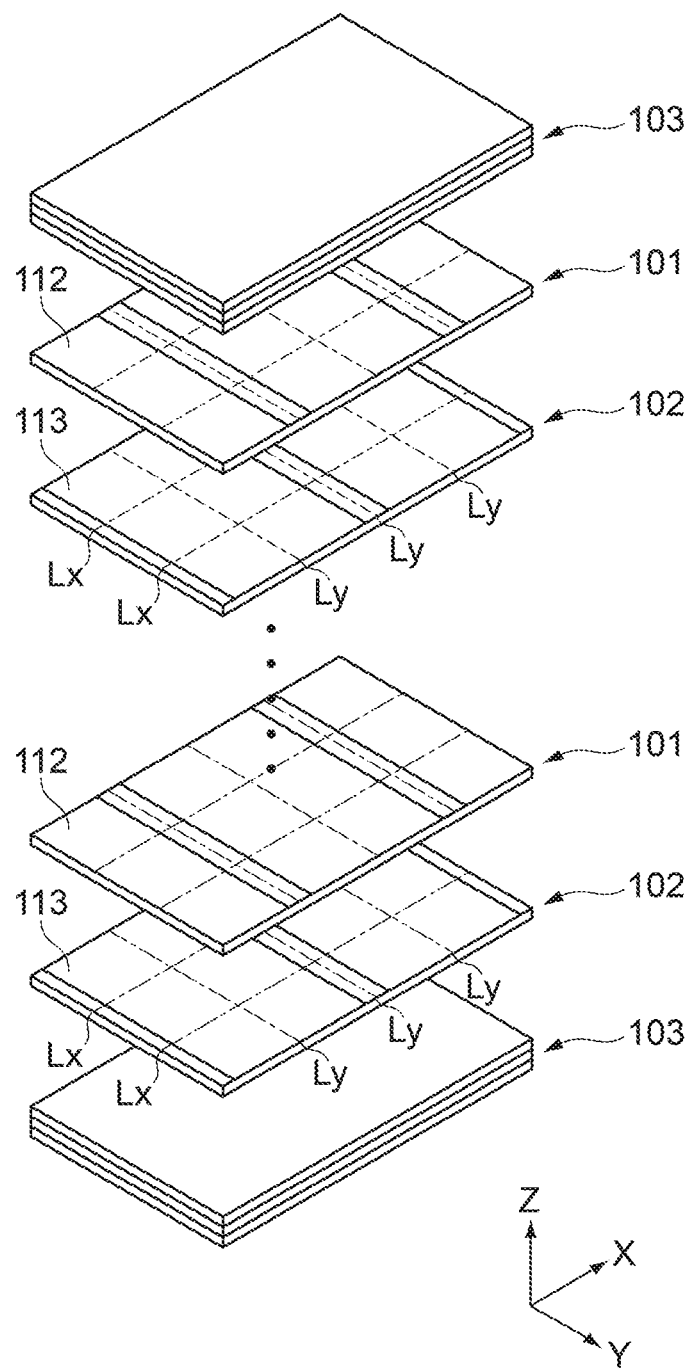
FIG. 7 is a perspective view showing a production process of the multi-layer ceramic capacitor.
Figure 8:
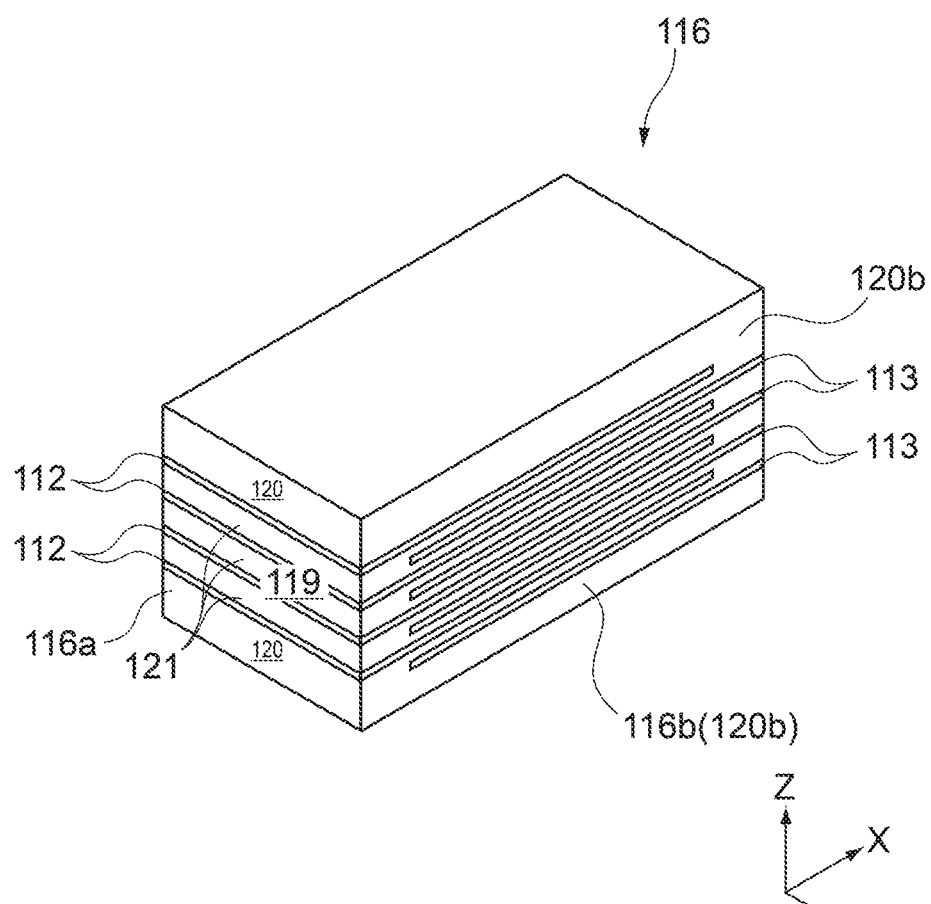
FIG. 8 is a perspective view showing a production process of the multi-layer ceramic capacitor.
Figure 9:
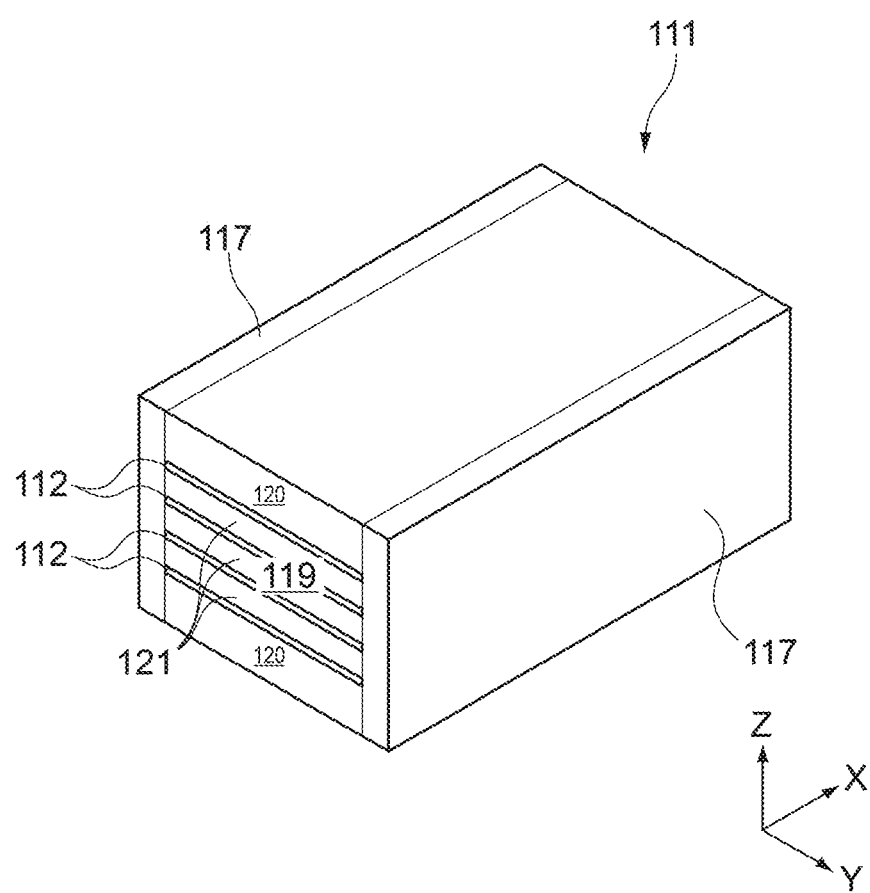
FIG. 9 is a perspective view showing a production process of the multi-layer ceramic capacitor.

FIG. 6 is a flowchart showing a method of producing the multi-layer ceramic capacitor 10. FIGS. 7 to 9 are views each showing a production process of the multi-layer ceramic capacitor 10. Hereinafter, the method of producing the multi-layer ceramic capacitor 10 will be described according to FIG. 6 with reference to FIGS. 7 to 9 as appropriate.

3.1 Step S01: Production of Ceramic Multi-Layer Chip 116

In Step S01, first ceramic sheets 101 and second ceramic sheets 102 for forming the capacitance forming unit 19, and third ceramic sheets 103 for forming the covers 20 are laminated and cut to produce an unsintered ceramic multi-layer chip (multi-layer chip) 116.

The first, second, and third ceramic sheets 101, 102, and 103 shown in FIG. 7 are configured as unsintered dielectric green sheets including dielectric ceramics as a main component. Unsintered first internal electrodes 112 corresponding to the first internal electrodes 12 are formed on the first ceramic sheets 101. Unsintered second internal electrodes 113 corresponding to the second internal electrodes 13 are formed on the second ceramic sheets 102. The internal electrodes are not formed on the third ceramic sheets 103.

Each of the first and second internal electrodes 112 and 113 has a plurality of belt-like electrode patterns, which extend across cutting lines Lx parallel to the X-axis direction and along cutting lines Ly parallel to the Y-axis direction. Those first and second internal electrodes 112 and 113 are formed by applying an electrically conductive paste to the first and second ceramic sheets 101 and 102 by printing or the like.

As shown in FIG. 7, the first and second ceramic sheets 101 and 102 are alternately laminated in the Z-axis direction. The laminate of the first and second ceramic sheets 101 and 102 corresponds to the capacitance forming unit 19. The third ceramic sheets 103 are laminated on the upper and lower surfaces of the laminate of the first and second ceramic sheets 101 and 102 in the Z-axis direction. The laminate of the third ceramic sheets 103 corresponds to the cover 20.

It should be noted that the number of first, second, and third ceramic sheets 101, 102, and 103 laminated or the like can be adjusted as appropriate.

Subsequently, the laminate of the first, second, and third ceramic sheets 101, 102, and 103 is pressure-bonded in the Z-axis direction and cut along the cutting lines Lx and Ly. Thus, a multi-layer chip 116 shown in FIG. 8 is produced.

The multi-layer chip 116 includes an unsintered capacitance forming unit 119 including unsintered internal electrodes 112 and 113, and unsintered covers 120. The multi-layer chip 116 has side surfaces 116b, which are cut surfaces corresponding to the cutting lines Lx, and end surfaces 116a, which are cut surfaces corresponding to the cutting lines Ly. End portions of the unsintered internal electrodes 112 and 113 are exposed from the side surfaces 116b.

3.2 Step 02: Adhesion of Base Metal Particles

In Step 02, base metal particles are caused to adhere to a region 120b occupied by each cover 120 on the side surface 116b.

The method of causing the base metal particles to adhere is not particularly limited. For example, when the base metal is vapor-deposited very thinly on the region 120b of the side surface 116b, the base metal particles can be caused to adhere to the region 120b. Alternatively, when a coating material, which includes base metal particles dispersed in an organic solvent at low concentration, is applied very thinly to the region 120b, the base metal particles can be caused to adhere to the region 120b. It should be noted that each of those vapor-deposition and application steps is performed while disposing a mask on the region occupied by the capacitance forming unit 119 on the side surface 116b, and thus the base metal particles can be selectively distributed in the region 120b of the side surfaces 116b.

The area occupancy ratio of the base metal particles to the region 120b can be set to, for example, 0.3% or more and 10% or less. This makes it possible to set the area occupancy ratio of the bonding portion 22 to the bonding surface 20b after sintering to 0.3% or more and 10% or less.

3.3 Step 03: Formation of Side Margin

In Step 03, an unsintered side margin 117 is provided to the side surface 116b of the multi-layer chip 116, to which the base metal particles adhere and which is obtained in Step 02. Thus, an unsintered ceramic body 111 shown in FIG. 9 is produced. The side margin 117 is formed of a ceramic sheet or ceramic slurry.

The side margin 117 can be formed by, for example, attaching a ceramic sheet to the side surface 116b of the multi-layer chip 116. Alternatively, the side margin 117 can also be formed by coating the side surfaces 116b of the multi-layer chip 116 with ceramic slurry by application or dipping, for example.

3.4 Step 04: Sintering

In Step 04, the unsintered body 111 obtained in Step 03 is sintered to produce the ceramic body 11 of the multi-layer ceramic capacitor 10 shown in FIGS. 1 to 3. In other words, in Step 04, the multi-layer chip 116 becomes the multi-layer chip 16, and the side margins 117 become the side margins 17.

A sintering temperature in Step 04 can be determined on the basis of a sintering temperature for the ceramic body 111. For example, when a barium titanate based material is used as dielectric ceramics, the sintering temperature can be set to approximately 1,000° C. to 1,300° C. Further, sintering can be performed in a reduction atmosphere or a low-oxygen partial pressure atmosphere, for example.

During the sintering, due to the different sintering behaviors of the multi-layer chip 116 and the side margin 117, stress is applied from the side margin 117 to the side surface 116b of the multi-layer chip 116. More specifically, first, the internal electrodes 112 and 113 formed of the base metal material start to be sintered at a temperature of several hundreds of degrees Celsius. Along with the sintering, the internal electrodes 112 and 113 shrink toward the center of the multi-layer chip 116 in the Y-axis direction. Meanwhile, the side margins 117, the covers 120, and the ceramic layers 121, which are formed of ceramic having high sintering temperature, are unsintered at a temperature of several hundreds of degrees Celsius and do not shrink. For that reason, stress in directions moving away from each other is generated in the Y-axis direction between the side surfaces 116b of the multi-layer chip 116 and the side margin 117.

In the sintering step of this embodiment, oxygen is supplied to the cover 120 from the outside of the ceramic body 111. This allows the base metal particles, which adhere to the region 120b occupied by the cover 120 on the side surface 116b, to be oxidized, thus forming the bonding portion 22 including the oxide of the base metal particles. The oxide starts to be generated at a temperature of several hundreds of degrees Celsius at which the internal electrodes start to be sintered.

The bonding portion 22 including the oxide has higher strength and higher resistance to the stress than those of the unsintered ceramic layers 121 and the unsintered side margin 117 in the state under a temperature of several hundreds of degrees Celsius. This allows the bonding portion 22 to prevent cracks and peeling from occurring in the bonding surface 20b.

Further, in the state under a temperature of several hundreds of degrees Celsius during the sintering, the bonding strength between the oxidized base metal material and the unsintered ceramic material is higher than the bonding strength between unsintered ceramic materials. So, the bonding portion 22 can serve the function of bonding the side margin 117 and the cover 120 to each other during the sintering in which stress occurs, and can prevent voids, which become start points of cracks and peeling, from being formed.

Additionally, since the particles 22a serving as the bonding portion 22 are dispersedly disposed, the bonding strength of the entire bonding surface 20b can be uniformly distributed, and voids or the like can be prevented from being locally formed. Further, the area occupancy ratio of the bonding portion 22 to the bonding surface 20b is set to, for example, 0.3% or more, and thus the bonding portion 22 can be formed at an enough density to obtain the effect of preventing the occurrence of cracks and peeling.

3.5 Step 05: Formation of External Electrode

In Step 05, the first and second external electrodes 14 and 15 are formed on the ceramic body 11 obtained in Step 04, to produce the multi-layer ceramic capacitor 10 shown in FIGS. 1 to 3. In Step 05, for example, base films, intermediate films, and surface films constituting the first and second external electrodes 14 and 15 are formed on the end surfaces of the ceramic body 11, which face in the X-axis direction.

More specifically, in Step 05, first, an unsintered electrode material is applied so as to cover both the end surfaces of the ceramic body 11, which face in the X-axis direction. The applied unsintered electrode materials are subjected to baking in a reduction atmosphere or a low-oxygen partial pressure atmosphere, for example, to form base films of the first and second external electrodes 14 and 15 on the ceramic body 11.

On the base films of the first and second external electrodes 14 and 15, which are baked onto the ceramic body 11, intermediate films of the first and second external electrodes 14 and 15 are then formed, and surface films of the first and second external electrodes 14 and 15 are further formed. For the formation of the intermediate films and the surface films of the first and second external electrodes 14 and 15, for example, plating such as electrolytic plating can be used.

It should be noted that part of the processing in Step 05 may be performed before Step 04. For example, before Step 04, the unsintered electrode material may be applied to both the end surfaces of the unsintered ceramic body 111, which face in the X-axis direction. This makes it possible to simultaneously perform sintering of the unsintered ceramic body 111 and baking of the unsintered electrode material in Step 04.

4. Example and Comparative Example

For Example and Comparative example of this embodiment, samples of the multi-layer ceramic capacitor 10 were produced by using the production method described above. In those samples, a dimension in the X-axis direction was set to 1 mm, and dimensions in the Y- and Z-axis directions were each set to 0.5 mm.

In the samples of Example, the step of adhesion of base metal particles in Step 02 was performed, and a bonding portion including a plurality of particles was formed on a region (bonding surface) occupied by the cover on the side surface of the multi-layer chip. The area occupancy ratio of the bonding portion to the bonding surface was 0.3% or more.

Meanwhile, in the samples of Comparative example, Step 02 was not performed, and the bonding portion was not formed.

For each sample, a defect rate of moisture resistance after sintering was evaluated. Specifically, a moisture resistance load test was performed on the samples under the environment having a test temperature of 85° C. and a relative humidity of 85% and under application of a rated voltage of 5 V for 100 hours. The resistance value obtained after the test was measured for each sample, and the samples having a resistance value smaller than 1 MΩ were determined as defectives in moisture resistance. The proportion of the samples, which were determined as defectives in moisture resistance, in the 1,000 samples was calculated as a defect rate of moisture resistance.

As a result, in the samples of Comparative example, in each of which the bonding portion was not formed, the defect rate of moisture resistance was 0.1%. Thus, it was confirmed that the samples of Comparative example have cracks, peeling, and the like between the side margin and the ceramic multi-layer chip and include the defectives with insufficient environmental resistance.

Meanwhile, in the samples of Example, in each of which the bonding portion was formed, the defect rate of moisture resistance was 0%. Thus, it was confirmed that the samples of Example have no cracks, peeling, and the like between the side margin and the ceramic multi-layer chip and have sufficient environmental resistance. Therefore, it was confirmed that the bonding portion enhances the bonding strength between the multi-layer chip and the side margin and enhances the environmental resistance.

5. Other Embodiments

Hereinabove, the embodiment of the present disclosure has been described, but the present disclosure is not limited to the embodiment described above. It should be appreciated that the present disclosure may be variously modified without departing from the gist of the present disclosure.

In addition to the configuration described above, a metal oxide may be formed on the end portions of the first and second internal electrodes 12 and 13 in the Y-axis direction. This configuration can strengthen the bonding between the capacitance forming unit 19 and the side margin 17 and enhance the bonding strength of the entire side surfaces of the multi-layer chip 16, which face in the Y-axis direction.

In the production method described above, the unsintered covers 120, the unsintered side margin 117, and the like may include magnesium. In this case, magnesium is supplied to the bonding surface of the cover 120 during sintering. Thus, the adhering base metal particles made of nickel or the like take in magnesium and oxygen, and thus the bonding portion 22 formed of an oxide including magnesium is formed. Therefore, the bonding portion 22 is sufficiently oxidized, and the configuration with high insulation properties is provided.

What is claimed is:

1. A multi-layer ceramic capacitor, comprising:
    a ceramic multi-layer chip including
        a capacitance forming unit including internal electrodes, the internal electrodes being laminated in a first direction and including a base metal material as a main component, positions of end portions of the internal electrodes in a second direction orthogonal to the first direction being aligned with one another within a range of 0.5 μm in the second direction, and
        a cover that is disposed outside the capacitance forming unit in the first direction and includes ceramics as a main component;
    a side margin that includes ceramics as a main component and covers the capacitance forming unit and the cover in the second direction, wherein an interface between the ceramic multi-layer chip and the side margin is composed of a first interface extending in the first direction over an entire area between the cover and the side margin, and a second interface extending in the first direction over an entire area between the capacitance forming unit and the side margin; and
    a bonding portion constituted by multiple bonding spots, wherein an oxide including the base metal material is included in the multiple bonding spots bonding portion and is disposed, among the first interface and the second interface, only in the first interface, wherein the first interface has a bonding surface consisting of a discrete surface of the cover extending in the first direction over an entire thickness of the cover and facing and bonded to the side margin in the second direction, wherein the multiple bonding spots are dispersed across the bonding surface in the first direction and a third direction perpendicular to the first direction and the second direction.

2. The multi-layer ceramic capacitor according to claim 1, wherein
    the bonding portion includes a plurality of particles disposed away from one another.

3. The multi-layer ceramic capacitor according to claim 1, wherein
    an area occupancy ratio of the bonding portion to the bonding surface is 0.3% or more.

4. The multi-layer ceramic capacitor according to claim 1, wherein
    an area occupancy ratio of the bonding portion to the bonding surface is 10% or less.

5. The multi-layer ceramic capacitor according to claim 1, wherein
    the base metal material includes nickel.

6. The multi-layer ceramic capacitor according to claim 1, wherein
    the oxide includes magnesium.

7. The multi-layer ceramic capacitor according to claim 1, wherein
    the ceramic multi-layer chip includes a side surface facing in the second direction, and
    the bonding surface includes a region occupied by the cover on the side surface.

8. The multi-layer ceramic capacitor according to claim 1, wherein
    the multiple bonding spots are dispersed randomly on the bonding surface.

9. The multi-layer ceramic capacitor according to claim 1, wherein the multiple bonding spots are discrete particles apart from each other.

10. A multi-layer ceramic capacitor comprising:
    a ceramic multi-layer chip including
        a capacitance forming unit including internal electrodes, the internal electrodes being laminated in a first direction and including a base metal material as a main component, positions of end portions of the internal electrodes in a second direction orthogonal to the first direction being aligned with one another within a range of 0.5 μm in the second direction; and
        a cover that is disposed outside the capacitance forming unit in the first direction and includes ceramics as a main component;
    a side margin that includes ceramics as a main component and covers the capacitance forming unit and the cover in the second direction; and
    a bonding portion that is disposed only on a bonding surface and includes an oxide including the base metal material, the bonding surface consisting of a discrete surface of the cover extending in the first direction over an entire thickness of the cover and facing and bonded to the side margin in the second direction, the bonding portion being comprised of multiple bonding spots dispersed across the bonding surface in the first direction and a third direction perpendicular to the first direction and the second direction,
    wherein the multiple bonding spots are discrete particles apart from each other, each particle having a particle size, which is a largest dimension of the particle, of about 0.1 to 2.0 μm.

11. The multi-layer ceramic capacitor according to claim 9, wherein each of the particles has a particle size, which is a largest dimension of the particle, of about 0.1 to 2.0 μm.

12. A method of producing a multi-layer ceramic capacitor, the method comprising:
    producing an unsintered ceramic multi-layer chip, the unsintered ceramic multi-layer chip including
        an unsintered capacitance forming unit including internal electrodes, the internal electrodes being laminated in a first direction and including a base metal material as a main component,
        an unsintered cover that is disposed outside the unsintered capacitance forming unit in the first direction and includes ceramics as a main component, and
        a side surface facing in a second direction orthogonal to the first direction, the internal electrodes being exposed from the side surface;
    causing base metal particles to adhere to a region occupied by the cover on the side surface;
    producing a ceramic body by providing a side margin to the side surface of the unsintered capacitance forming unit and the unsintered cover, wherein an interface between the ceramic multi-layer chip and the side margin is composed of a first interface extending in the first direction over an entire area between the cover and the side margin, and a second interface extending in the first direction over an entire area between the capacitance forming unit and the side margin; and sintering the ceramic body and oxidizing the base metal particles, to form a bonding portion constituted by multiple bonding spots, wherein an oxide including the base metal material is included in the multiple bonding spots and is disposed, among the first interface and the second interface, only in the first interface, wherein the first interface has a bonding surface consisting of a discrete surface of the cover extending in the first direction over an entire thickness of the cover and facing and bonded to the side margin in the second direction, wherein the multiple bonding spots are dispersed across the bonding surface in the first direction and a third direction perpendicular to the first direction and the second direction.

\* \* \* \* \*

UNITED STATES PATENT AND TRADEMARK OFFICE
CERTIFICATE OF CORRECTION

| | |
|---|---|
| PATENT NO. | : 11,742,143 B2 |
| APPLICATION NO. | : 16/743989 |
| DATED | : August 29, 2023 |
| INVENTOR(S) | : Shin Aida |

It is certified that error appears in the above-identified patent and that said Letters Patent is hereby corrected as shown below:

In the Claims

Column 11, Line 35, in Claim 1, after the term "multiple bonding spots", the term "bonding portion" should be deleted Signed and Sealed this
Twenty-eighth Day of November, 2023

*Katherine Kelly Vidal*

Katherine Kelly Vidal
*Director of the United States Patent and Trademark Office*